Jan. 22, 1935.   J. E. ROBB   1,988,809
TEMPERATURE CONTROL SYSTEM
Filed Sept. 21, 1933
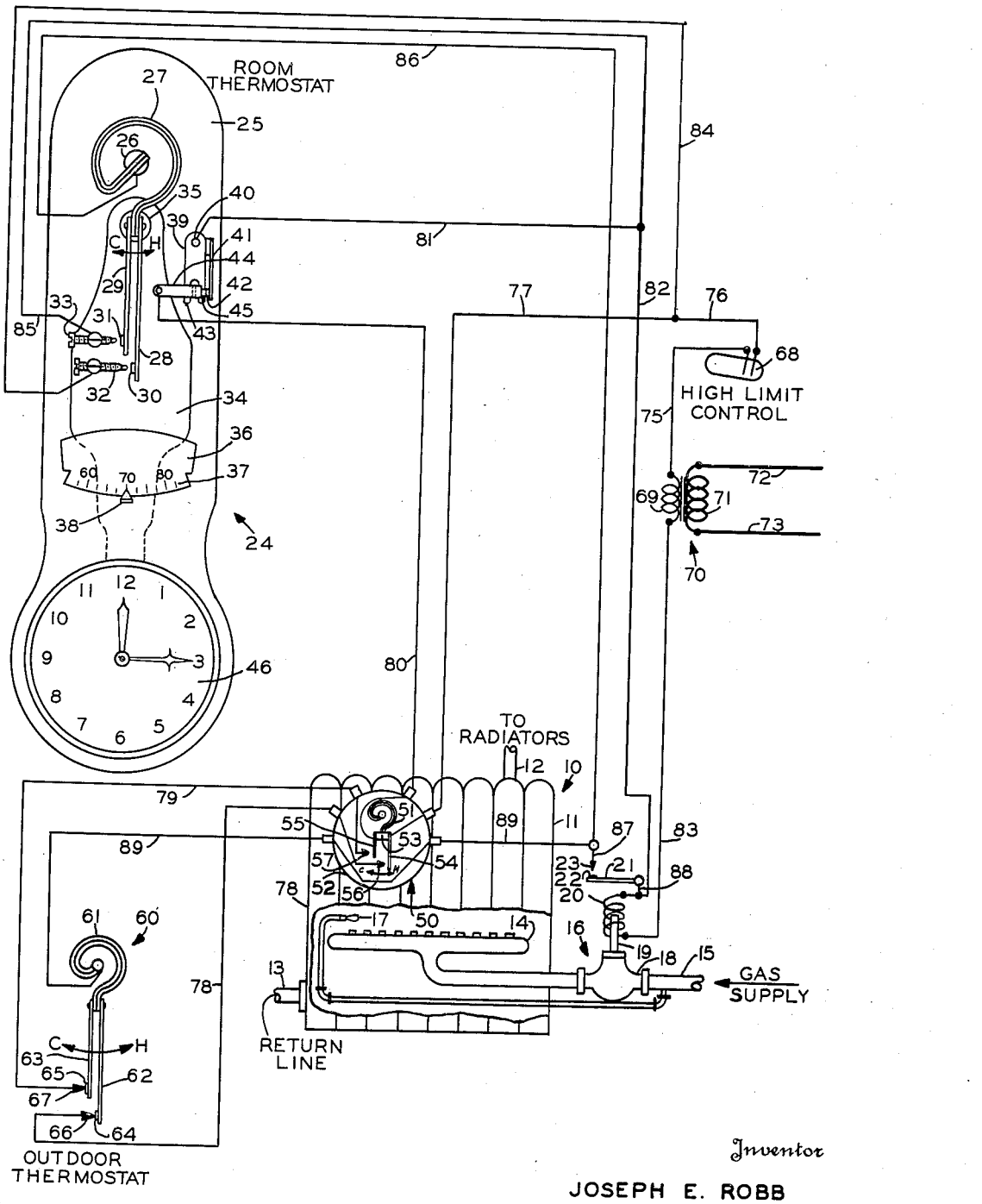
Inventor
JOSEPH E. ROBB
By George H. Fisher
Attorney Patented Jan. 22, 1935

1,988,809

UNITED STATES PATENT OFFICE 1,988,809

TEMPERATURE CONTROL SYSTEM

Joseph E. Robb, Topeka, Kans., assignor to Minneapolis-Honeywell Regulator Company, Minneapolis, Minn., a corporation of Delaware Application September 21, 1933, Serial No. 690,391

3 Claims. (Cl. 236—91)

The present invention relates to an improved system for controlling temperatures and although the system of the present invention will be hereinafter described and explained in connection with heating systems, it is to be understood that it is equally applicable to the control of other types of temperature changing systems.

In heating buildings, dwellings, and other spaces, it is usual to provide a heating means in the form of a boiler, furnace, radiator, etc., which is primarily controlled by a thermostat responsive to the temperature of the space. Such a space temperature responsive control has been found to be sufficient in many cases during relatively cold weather but in mild weather, when the space thermostat only calls for heat at prolonged intervals, it has been found that the boiler, furnace or radiator, etc. becomes quite cool during these long standby periods. This results in stratification of the air in the space to be heated (known as "cold 70°" wherein the temperature at the thermostat is 70° but at the floor line is considerably lower) and also thereafter requires a relatively long period of time before further heat can be delivered to the space upon a call for heat by the room thermostat.

In order to overcome these difficulties, it has been proposed to additionally utilize a control which more directly responds to a heat condition of the boiler, furnace or radiator and to supply sufficient heat thereto in response to the action of the condition responsive control to prevent the value of said condition from falling below a predetermined amount. Auxiliary controls of this type are often termed "low-limit controls" since they act, in the case of hot water boilers, to prevent the boiler water temperature (or the radiator temperature if applied to a radiator) from falling below some predetermined value. In this manner, there is always a small amount of heat furnished to the space to be heated so as to prevent air stratification therein and the heater is never entirely cold so that it quickly responds to a call for heat by the room thermostat.

Such a system overcomes the difficulties above pointed out but gives rise to a new difficulty when the weather becomes extremely mild. When the outdoor temperature approaches the desired room temperature, the action of the low limit control often causes overheating of the space. This is undesirable both from the standpoint of close temperature control and economy.

In order to overcome these new difficulties, I propose to include an outdoor thermostat in a low limit control system for rendering the low limit control inoperative when the outdoor temperature approaches the desired room temperature whereby the advantages of the low limit control may be retained during such weather as it is needed and its disadvantages can be eliminated during extremely mild weather.

An object of the invention is the provision of a temperature control system including a space temperature responsive thermostat and a device more directly responsive to a condition of the temperature changing means for conjointly controlling the operation of the temperature changing means and additionally providing an outdoor temperature responsive thermostat for rendering said device inoperative when the outdoor temperature approaches the desired space temperature.

More specifically, an object of the invention is the provision of a heat controlling system including a room thermostat and a low limit control together with a thermostat responsive to outdoor temperature for rendering the low limit control inoperative when the outdoor temperature rises to within a predetermined amount below the desired room temperature.

In some systems, it is desired to utilize a clock controlled space temperature responsive thermostat for changing the setting of the space thermostat and simultaneously rendering the low limit control inoperative to initiate the supply of heat to the space. A further object of the invention is the use of an outdoor temperature responsive thermostat in such a system for rendering the low limit control inoperative whenever the outdoor temperature rises to a predetermined value.

Other objects of the invention will be found in the drawing, description and appended claims.

For a more complete understanding of the invention, reference may be had to the following description and accompanying single drawing which is a schematic showing of one form of the instant invention.

Referring to the single figure of the drawing, a heating means is generally indicated at 10 and is herein shown as comprising a hot water boiler 11 from which hot water is supplied to one or more radiators in the space to be heated by a main 12 and returns therefrom to the boiler by a return line 13. The boiler is heated by a gas burner 14 to which gas is supplied by the gas supply pipe 15 controlled by an electrically operated valve, generally indicated at 16. A pilot light of ordinary construction, indicated at 17, operates to ignite the gas furnished to burner 14. It is to be understood that the hot water boiler 11 is merely exemplary of one of the many types of temperature changing devices to which the present system of control may be applied. The hot water boiler 11 could well be replaced by a steam boiler, furnace, unit heater, or any one of the many usual temperature changing means. Likewise, the electrically operated valve 16 is merely indicative of one of many manners in which the operation of the hot water boiler 11 may be controlled.

For simplicity of illustration, the electrically operated valve 16 is herein shown as comprising a casing 18 (having the usual valve opening and associated seat therein) and a plunger 19 which is adapted to be raised to open the valve upon energization of an electromagnetic coil 20. Energization of electromagnetic coil 20 also operates to close a holding switch comprising a switch arm 21 controlling a contact 22 which is adapted to engage a relatively stationary contact 23. The particular type of electrically operated valve 16 is not important in the present invention and it may well take the form of the electromagnetic valve shown in Frederick S. Denison Patent No. 1,607,392 which issued November 16th, 1926.

The electrically operated valve 16 is primarily controlled by a room thermostat, generally indicated at 24, which responds to the temperature of the space to be controlled. The room thermostat 24 comprises a base 25 to which is secured a post 26. One end of a bimetallic thermostatic element 27 is carried by post 26 and the other end terminates in a downwardly extending portion to which is secured flexible blades 28 and 29. Blade 28 carries a contact 30 at its lower extremity and blade 29 carries a similar contact 31 at its lower extremity. Contacts 30 and 31 are adapted to cooperate with relatively stationary contact screws 32 and 33 which are carried by an adjusting plate 34 which is pivoted, as indicated at 35, to the base 25. In order to control the particular type of temperature changing device herein shown and described, the blades 28 and 29 are moved towards contact screws 32 and 33 upon lowering in the temperature to which bimetallic element 27 responds. The arrangement is such that upon a lowering in the space temperature contact 30 first moves into engagement with contact screw 32 and upon a further temperature fall, blade 28 flexes and allows contact 31 to be brought into engagement with contact screw 33.

The base 25 supports a bridge 26 which carries indicia 37 that cooperate with a manually operable pointer 38 by means of which adjusting plate 34 may be rotated about its pivot 35 to change the adjustment or setting of the room thermostat 24 so that contacts 30 and 31 will be brought into engagement with contact screws 32 and 33 at varying space temperatures.

The room thermostat 24 is preferably of the type in which an auxiliary switch is operated as the result of movement of adjusting plate 34. This auxiliary switch is herein diagrammatically shown as comprising an arm 39 which is frictionally mounted to base 25, as indicated at 40, and carries a flexible switch arm 41 which supports a contact 42. The lower end of arm 39 is provided with an upwardly extending slot 43 which receives the bent over end of an actuator 44 which is carried by and secured to adjusting plate 34. Actuator 44 carries contact 45 which is adapted to cooperate with contact 42. Upon adjustment of adjusting plate 34 about its pivot 35 in a clockwise direction to lower the temperature setting of the room thermostat 24, actuator 44 first moves its contact 45 from engagement with the cooperating contact 42 and thereafter moves arm 39 in the same direction so as to limit the maximum amount of separation between contacts 42 and 45. As a result, upon a subsequent movement of adjusting plate 34 in a counterclockwise direction to raise the temperature setting of the room thermostat 24, contact 45 will immediately upon initial movement be brought into engagement with its cooperating contact 42. In this manner, the auxiliary switch defined by contacts 42 and 45 is opened and closed upon initial movements of adjusting plate 34 in directions to lower and raise the temperature setting of the room thermostat 24.

The adjusting plate 34 besides being capable of manual adjustment is preferably additionally controlled by a clock mechanism 46 in order that the adjusting plate 34 may be automatically operated at predetermined hours of night and morning to respectively lower and raise the setting of the room thermostat 24. The various contacts and switches of the room thermostat 24 are of course properly electrically insulated from the base 25 and from each other. For additional details of the room thermostat 24, reference may be had to George D. Kingsland Patent No. 1,893,237 which issued January 3rd, 1933.

The temperature changing means 10 is additionally controlled by a low limit control generally indicated at 50. This low limit control includes bimetallic thermostatic element 51 which responds to the temperature of the water in the hot water boiler 11. One end of thermostatic element 51 is suitably secured to the casing 52 of low limit control 50 and the other end thereof is secured to and controls the movements of a block of insulating material 53. Flexible blades 54 and 55 are carried by insulating block 53 and respectively cooperate with stationary contacts 56 and 57. The arrangement is such that upon a fall in the temperature of the boiler water, blade 54 first engages contact 56 and thereafter upon a further fall in boiler water temperature, blade 54 flexes and allows blade 55 to engage contact 57. The low limit control 50 is representative of a device which responds to a condition of the temperature changing means 10 and where the low limit control 50 is a temperature responsive device, it is noted that it responds more directly to the temperature of the temperature changing means 10 than does the room thermostat 24. Low limit control 50 need not necessarily be placed at the boiler itself and could well respond to the temperature of one of the radiators in the space to be heated. The function of the low limit control 50 is to prevent the boiler water temperature from falling below some predetermined value irrespective of the condition of the room thermostat 24. The various switches of low limit control 50 are of course properly insulated from the casing 52 and from each other.

The control function of low limit control 50 is modified by a thermostat which responds to outdoor temperature changes, and this outdoor thermostat is generally indicated at 60. The outdoor thermostat comprises a bimetallic actuator 61, having one of its ends secured. The other end of the actuator 61 terminates in a downwardly extending portion which carries a pair of flexible blades 62 and 63 to the lower extremities of which are secured contacts 64 and 65. Contacts 64 and 65 are adapted to cooperate with relatively stationary contacts 66 and 67. The arrangement is such that upon a rise in outdoor temperature, the contact 65 first disengages contact 67 and upon a further rise in the outdoor temperature contact 64 disengages contact 66. The outdoor thermostat 60 is so adjusted that the switches controlled thereby open when the outdoor temperature approaches the desired space temperature. The particular setting of the outdoor thermostat 60 depends upon the space temperature which it is desired to maintain and will also vary for different types of heating systems. Where it is desired to maintain a space temperature of substantially 70°, it has been found that the outdoor thermostat should open its circuits at from 60 to 65°, although, as above stated, the temperature setting of the outdoor thermostat may well vary in order to obtain the best results from various types of systems.

The control system also preferably includes a high limit control indicated by mercury switch 68. The high limit control 68 responds to the boiler water temperature and prevents further heating of the boiler water if the temperature thereof becomes excessive.

Low voltage electrical power is supplied by the secondary 69 of a step-down transformer 70, having a primary 71 connected to line voltage wires 72 and 73. The remaining circuit connections will be described and identified during the description of the operation of the system as a whole.

Operation

With the parts in the position shown, the apparatus is on a day cycle with the room thermostat 24 set to maintain a space temperature of 70° F. and the space temperature is at or above this point as indicated by contacts 30 and 31 being out of engagement with contact screws 32 and 33 respectively. Also, the auxiliary switch defined by contacts 42—45 is closed. The temperature of the boiler water is sufficiently high to furnish a small supply of heat to the space to prevent stratification of the air therein as indicated by flexible blades 54 and 55 being disengaged from their respective contacts 56 and 57. The boiler water temperature however is not excessive since the high limit switch 68 is in its closed circuit position. Furthermore, the outdoor weather conditions are not extremely mild inasmuch as contacts 64 and 65 of outdoor thermostat 60 are respectively engaged with their cooperating contacts 66 and 67. The electrically operable valve 16 is therefore closed and no gas is being supplied to burner 14.

Inasmuch as no heat is being supplied to the boiler water, the temperature thereof will decrease and likewise the temperature of the space will decrease. When the space temperature falls to the desired minimum, contact 30 will first engage contact screw 32 and thereafter contact 31 will engage contact screw 33 as hereinbefore pointed out. Similarly, when the boiler water temperature falls to its desired minimum value, blades 54 and 55 will sequentially engage contacts 56 and 57. Either the space temperature or the boiler water temperature may be the first to fall to the desired minimum depending upon various conditions such as the severity of the outside weather conditions, etc. Assuming that the boiler water temperature is the first to reach its desired minimum value so as to close switches 54—56 and then 55—57, an energizing circuit for electromagnetic winding 20 will be established as follows: secondary 69, wire 75, high limit control 68, wire 76, wire 77, blade 54, contact 56, wire 78, contact 66, contact 64, blades 62 and 63, contact 65, contact 67, wire 79, contact 57, blade 55, wire 80, contact 45, contact 42, wire 81, wire 82, electromagnetic coil 20 and wire 83 to the other side of secondary 69. It will be noted that this initial energizing circuit for electromagnetic coil 20 controlled by the low limit control 50 includes both the switches of the low limit control and both of the switches of the outdoor thermostat and the auxiliary switch 42—45. If, on the other hand, the room temperature should be the first to reach its minimum desired value, an energizing circuit for electromagnetic coil 20 will be established as follows: secondary 69, wire 75, high limit control 68, wire 76, wire 84, contact screw 32, contact 30, blades 28 and 29, contact 31, contact screw 33, wire 85, wire 82, electromagnetic coil 20 and wire 83 to the other side of secondary 69.

Energization of electromagnetic coil 20 opens the valve in casing 18 to allow gas to flow to the burner 14 which gas is ignited by the pilot light 17. Energization of electromagnetic coil 20 also causes switch arm 21 to move contact 22 into engagement with contact 23. Operation of burner 14 will heat the boiler water and raise the temperature of the space. As long as auxiliary switch 42—45 and the contacts 64—66 of outdoor thermostat 60 remain closed, electromagnetic coil 20 will remain energized until both the room thermostat 24 and the low limit control 50 are completely satisfied, since engagement of contacts 22 and 23 establish holding circuits through both the room thermostat and through the low limit control and outdoor thermostat. The holding circuit controlled by the room thermostat is as follows: secondary 69, wire 75, high limit control 68, wire 76, wire 84, contact screw 32, contact 30, blade 28, bimetallic element 27, wire 86, wire 87, contact 23, contact 22, switch arm 21, wire 88, electromagnetic coil 20, and wire 83 to the other side of secondary 69.

The holding circuit controlled by the low limit control 50 and the outdoor thermostat in series is as follows: secondary 69, wire 75, high limit control 68, wire 76, wire 77, blade 54, contact 56, wire 78, contact 66, contact 64, blade 62, actuator 61, wire 89, wire 87, contact 23, contact 22, switch arm 21, wire 88, electromagnetic coil 20 and wire 83 to the other side of the secondary 69.

From the foregoing description of the initial energizing and holding circuits, it will be seen that the room thermostat 24 can initially energize electromagnetic coil 20 at any time when both its switches 30—32 and 31—33 are closed. In a similar manner, when auxiliary switch 42—45 is closed and when both switches 64—66 and 65—67 of the outdoor thermostat are closed, closure of the two low limit control switches 54—56 and 55—57 establishes an initial energizing circuit for electromagnetic coil 20. Whenever electromagnetic coil 20 has once been energized, room thermostat 24 can maintain energization thereof after opening of switch 31—33 and until switch 30—32 opens. Likewise, electromagnetic coil 20 may be maintained energized independently of auxiliary switch 42—45 and independent of switch 65—67 of outdoor thermostat 60 and independent of the switch 55—57 of low limit control 50.

When the outdoor temperature rises to some predetermined value which is less than but closely approaches the desired space temperature so as to open outdoor thermostat switches 64—66 and 65—67, then, the low limit control 50 is both incapable of initially energizing electromagnetic coil 20 or of maintaining energization thereof after the same has been initially energized by the room thermostat. In this manner, during relatively cool weather, when the outdoor thermostat switches are closed, the boiler water temperature is maintained at or above a given minimum irrespective of the temperature in the space so as to prevent air stratification therein and so as to condition the boiler for a quick response upon a call for heat by the room thermostat. However, when the outdoor temperature rises to such a point that the maintaining of this minimum boiler water temperature may result in overheating of the space, the outdoor theromstat renders the low limit control incapable of energizing electromagnetic coil 20 to heat the boiler water with the result that the boiler water temperature is controlled entirely by the room thermostat 24.

If the setting of the room thermostat 24 is lowered either by manual adjustment of adjusting plate 34 or automatically by the clock 46 so that auxiliary switch 42—45 opens, then in such event, the low limit control 50 is rendered incapable of initially energizing electromagnetic coil 20 to initiate the supply of heat to the boiler water. However, opening of switch 42—45 does not prevent the low limit control 50 from maintaining energization of electromagnetic coil 20 after the same has once been energized by the room thermostat 24.

From the foregoing description, it will be apparent that the present invention makes it possible to utilize systems including low limit controls and the like and at the same time does away with the disadvantages which sometimes arise in such systems.

While a specific embodiment of the invention has been herein described in connection with a specific type of heating system, it is to be understood that modifications can be made therein and that the system of the invention is equally applicable to other types of temperature control systems. I therefore only intend to be limited in the purview of the appended claims.

I claim as my invention:

1. In combination, a heater for heating a fluid medium, an electrical device for controlling said heater, a space temperature responsive switch, a circuit including said switch and in control of said device, a fluid medium temperature responsive switch, means for raising and lowering the setting of said space temperature responsive switch, a third switch moved to closed and open positions by said last named means, an outdoor temperature responsive switch, and a circuit in control of said device and including said third switch, fluid medium temperature responsive switch and outdoor temperature responsive switch in series.

2. In combination, heating means, an electrically operable device in control thereof, a holding switch moved to closed position thereby when energized, heating means condition responsive switching means including a first switch and a second switch which move to open circuit position in sequence in the order named upon an increase in the value of said condition, a single thermostatic element responsive to outdoor temperatures, third and fourth switches sequentially opened in the order named upon an increase in the outdoor temperature to predetermined values, an energizing circuit for said device including said first and third switches in series, and holding circuit for said device including said second, fourth, and holding switches in series.

3. In combination, a heater, an electrically operable gas valve adapted to supply gas to said heater when energized, a holding switch moved to closed position by said gas valve when energized, a space temperature responsive thermostat, a first energizing circuit for said gas valve controlled by said space temperature responsive thermostat, an element more directly responsive to the condition of said heater, first and second switches moved to open position thereby in the sequence named upon increase in the value of said condition, a single thermostatic element responsive to outdoor temperature, third and fourth switches sequentially opened thereby in the order named when the outdoor temperature rises to predetermined values, a second energizing circuit for said gas valve controlled by the first and third switches in series, and a holding circuit for the gas valve controlled by the second, fourth, and holding switches in series.

JOSEPH E. ROBB.